Oct. 13, 1925.

E. O. EMERSON

EXTENSION ATTACHMENT FOR AUTOMOBILE PEDALS

Filed March 10, 1925

1,556,921

Inventor,
Edwin O. Emerson
By Frederick E. Bromley
Atty.

Patented Oct. 13, 1925.

1,556,921

UNITED STATES PATENT OFFICE.

EDWIN O. EMERSON, OF GANANOQUE, CANADA.

EXTENSION ATTACHMENT FOR AUTOMOBILE PEDALS.

Application filed March 10, 1925. Serial No. 14,577.

*To all whom it may concern:*

Be it known that I, EDWIN O. EMERSON, a citizen of the United States of America, resident of the town of Gananoque, in the Province of Ontario, in the Dominion of Canada, have invented new and useful Improvements in Extension Attachments for Automobile Pedals, of which the following is a specification.

The invention relates to improvements in extension attachments for automobile pedals as described in the present specification and shown in the accompanying drawings which form part of the same.

Whereas the transmission for the well known Ford automobile includes in its control a reverse pedal that is located between, and in close proximity to, the clutch and brake pedal; it frequently occurs that in the operation of such reverse pedal the driver does not plant his foot squarely upon its tread with the result that either one of the neighbouring pedals is actuated on account of his stepping on both pedals simultaneously. This actuation of both pedals is very injurious to the brake-lining of the transmission and unduly strains the motor: hence, the object of this invention is to provide an extension attachment for the reverse pedal in order that it may be raised above the other pedals with a view to overcoming the difficulty hereinbefore recounted.

The invention consists substantially of a base provided with a clamp for attachment to the tread of an automobile reverse pedal, from which base rises a plate adjustably carrying a tread receptive to the operator's foot.

Figure 1:
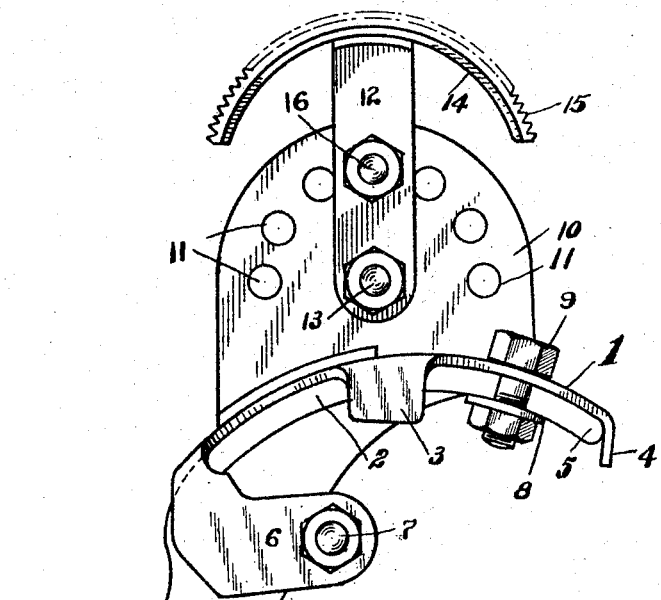

Referring to the drawings, Figure 1 is a side elevation of the invention shown in position upon a reverse pedal.

Figure 2:
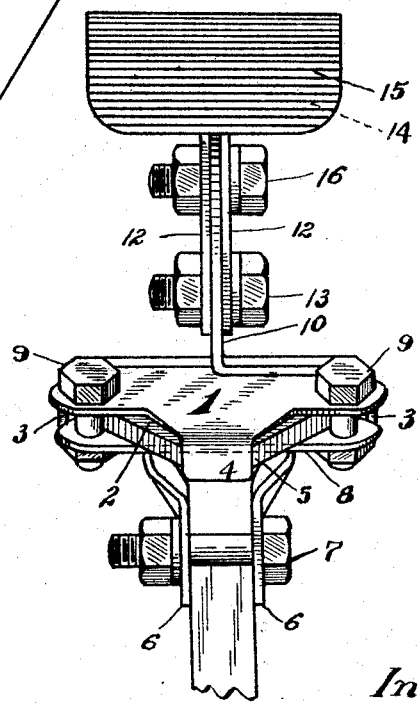

Figure 2 is an end view of Figure 1.

Like numerals of reference indicate corresponding parts in each figure throughout the drawings.

In the drawings the reference numeral 1 indicates an arcuate plate shaped to fit the face of the automobile reverse pedal 2 and constitute a base. Depending from each side of this base are ears 3, which hold the same from lateral shifting. At one end of this base is a downwardly turned lug 4 which abuts the free extremity 5 of the reverse pedal and serves to secure the base from shifting endwise.

At the other end of the base are a pair of arms 6 extending one on each side of the pedal and closely hugging the same. These arms are clamped together, preferably by a bolt and nut 7 passing through apertures situated about the extremity thereof.

Intermediate of the ears 3 and lug 4 is a transverse plate 8 which is clamped against the under-face of the pedal 2 by bolts and nuts 9 passing through the base about the extremities of said plate. It will be seen by this construction that the arms 6 and the clamp plate 8 detachably secure the base to the tread.

Rising from the base in the plane of the pedal, is a plate 10 terminating in a rounded off end in the form of a semi-circle. Concentric with this semi-circular end are a series of apertures 11, and pivoted at each side of said plate, situated approximately radially of its rounded end, are straps 12; the pivotal connection being preferably made by a bolt and nut as at 13. These straps extend slightly beyond the edge of the plate and carry a rigid tread comprising an arcuate member 14 faced preferably with a rubber pad 15 in order to provide a gripping surface. This tread is adjustable in relation to the base by selectively engaging the bolt 16 in any one of the apertures 11 and securing the straps 12 by tightening a nut thereupon. By this construction it will be observed that this device provides an extension tread which may be readily clamped to the reverse pedal of an automobile.

Whilst I have illustrated and described what I now consider to be the preferred embodiment of my invention, it is understood that the device may be modified in various ways both as to the form and construction of the several parts and also as to the arrangement without departing from the spirit of my invention. I therefore do not wish to restrict myself closely to the precise disclosure made, but desire to avail myself of all modifications as may fall within the scope of the appended claims.

What I claim is:

1. The combination with a pedal of the class described, of an extension therefor comprising a base shaped to fit the face of the pedal-tread, a pair of clamping arms arranged to secure an end of said base to the aforesaid tread, a plate, means for clamping said plate to the tread in the proximity of the other end of said base, members rigidly depending from the said base for abutment with the marginal edges of the said tread, and a tread mounted upon the base adjustable in the plane of the pedal.

2. The combination with a pedal of the class described, of an extension therefor comprising a base shaped to fit the face of the pedal-tread, a pair of clamping arms arranged to secure an end of said base to the aforesaid tread, a plate, means for clamping said plate to the tread in the proximity of the other end of said base, members rigidly depending from the said base for abutment with the marginal edges of the said tread, a plate rigidly rising from the base, said plate being provided with apertures, a pair of straps pivoted to said latter plate, a tread carried by said straps, and means for selectively engaging any one of the plate apertures in order to adjust the extension-tread.

3. The combination with a pedal of the class described, of an extension therefor comprising a base, means for clamping the base to said pedal, a plate rigidly rising from said base terminating in a rounded-off end, a tread support pivoted to said plate concentrically with its rounded-off end, a tread carried by said support, the aforesaid plate being provided with a series of apertures arranged in concentric formation relative to the pivot of said support, and a bolt for selective engagement in any one of these apertures in order to adjust the extension-tread.

Signed at Gananoque, Ontario, Canada, this 2d day of March, 1925.

EDWIN O. EMERSON.